United States Patent [19]

Miller

[11] Patent Number: 4,492,952

[45] Date of Patent: Jan. 8, 1985

[54] AUTOMOTIVE DRIVING CONDITION ALARM SYSTEM

[75] Inventor: Albert J. Miller, Los Gatos, Calif.

[73] Assignee: Atlas Electronics International, Santa Clara, Calif.

[21] Appl. No.: 367,340

[22] Filed: Apr. 12, 1982

[51] Int. Cl.[3] .......... B60Q 1/00

[52] U.S. Cl. .......... 340/52 F

[58] Field of Search .......... 340/52 R, 52 F, 580, 340/581, 57, 65, 670

[56] References Cited

U.S. PATENT DOCUMENTS

| | | | |
|---|---|---|---|
| 3,594,772 | 7/1971 | Setser | 340/52 R |
| 3,953,830 | 4/1976 | Williams | 340/52 R |
| 4,210,905 | 7/1980 | Coons | 340/52 R |
| 4,222,044 | 9/1980 | Boschung | 340/581 |
| 4,359,713 | 11/1982 | Tsunoda | 340/52 F |
| 4,414,541 | 11/1983 | Ho | 340/65 |

*Primary Examiner*—Douglas W. Olms
*Assistant Examiner*—Wellington Chin
*Attorney, Agent, or Firm*—Harris Zimmerman; Howard Cohen

[57] ABSTRACT

A system for monitoring and warning of dangerous driving conditions includes sensors mounted on the vehicle for detecting excessive moisture on the road surface, freezing temperature at the road surface, vibration of the vehicle in both horizontal and vertical directions, excessive vehicular speed, and drowsiness of the driver of the vehicle. The sensors are connected through detector circuits to an audible alarm and to a visual display which warns the driver of a dangerous driving condition.

9 Claims, 5 Drawing Figures

AUTOMOTIVE DRIVING CONDITION ALARM SYSTEM

BACKGROUND OF THE INVENTION

The following United States patents comprise the closest known prior art:

U.S. Pat. Nos. 4,017,843; 4,196,338; 3,678,494; 3,891,979; 3,631,446; 3,882,381; 3,585,626; 3,350,941; 3,873,927; 4,078,224; 3,596,263; 3,798,594.

Early in 1843, the director of the United States Patent Office recommended to Congress that the office be closed, "because there is nothing left to be invented". Within a short period of time following this pronouncement, the Patent Office was deluged with thousands of new ideas. This deluge became the first surge of the Industrial Revolution and the age of labor saving machines.

A continued surge of ideas, and resultant new consumer products, is even more pronounced today. As our machinery and tools of living become more commplicated, new ideas, which coupled to them and produce new products, abound.

A few years ago, when the hood of the automobile was opened, we were presented with an engine compartment which left room for working on the engine, and for adding accessories of our choice. Today, the compartment is completely filled with fuel devices, anti-smog devices, air conditioners, compressors, etc. As regulations governing the internal combustion engine proliferate, the need to use modern, efficient means of control will abound. The increasing cost of fuel only intensifies our desire to use that fuel, and the automobile, in the most efficient manner.

Until recently, the method of control and efficient management of such complicated electromechanical devices as the automobile was not feasible, and indeed not even necessary. With the advent of solid state electronics, modular construction of components and processors, this management and control is now feasible.

Today's automobile is a marvel of sophisticated electromechanical devices which propel the vehicle, and provide us with requisite safety features. As more convenience and more safety features become a standard part of the automobile, the driving compartment becomes more isolated, safer, and quieter. This isolation is both helpful and restful, but presents problems of safety to today's driver. As more mechanical and sound insulation is provided, the possibility of accidental lack of attention or drowsiness increases exponentially. Any device which can warn us of drowsiness, erratic driving behavior, or bad road conditions, is a welcome addition to safety and peace of mind.

SUMMARY OF THE PRESENT INVENTION

The present invention generally comprises a system for monitoring and warning of dangerous driving conditions. It includes sensors mounted on the vehicle for detecting excessive moisture on the road surface, freezing temperature at the road surface, vibration of the vehicle in both horizontal and vertical directions, excessive vehicular speed, and drowsiness of the driver of the vehicle. The sensors are connected through detector circuits to an audible alarm and to a visual display which warns the driver of a dangerous driving condition.

A BRIEF DESCRIPTION OF THE DRAWING

DESCRIPTION OF THE PREFERRED EMBODIMENT

The present invention generally comprises a driving condition monitoring system for monitoring a plurality of diverse and significant driving conditions and for warning the driver when one of these conditions poses a safety hazard. The driving conditions which are surveyed by the present invention include road surface temperature and moisture, vehicle speed and motion, and the driver's lack of attention or responsiveness.

Figure 1:
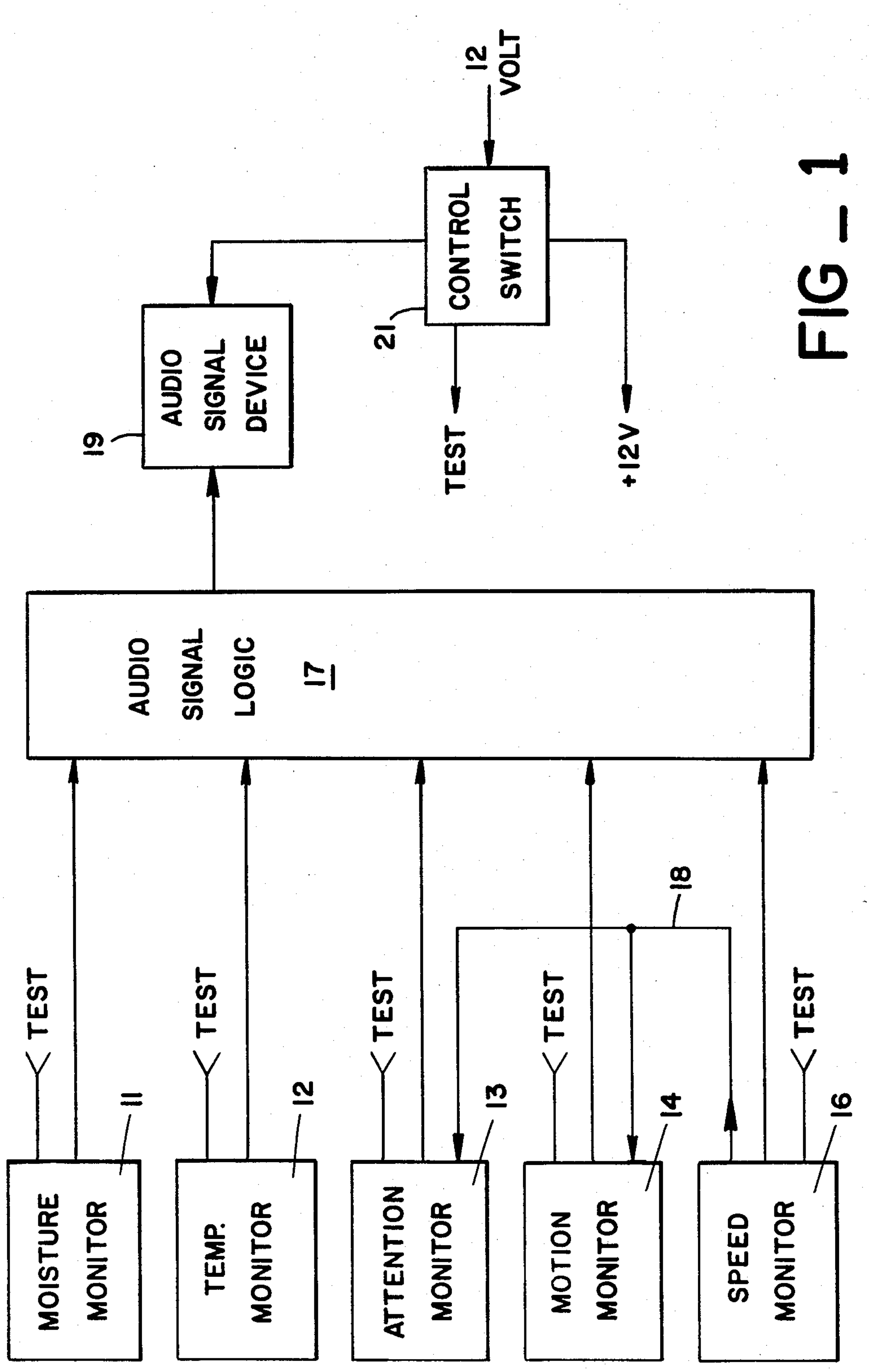
FIG. 1 is a block diagram depicting the functional interrelationships of the components of the driving condition monitoring system of the present invention.
Figure 2:
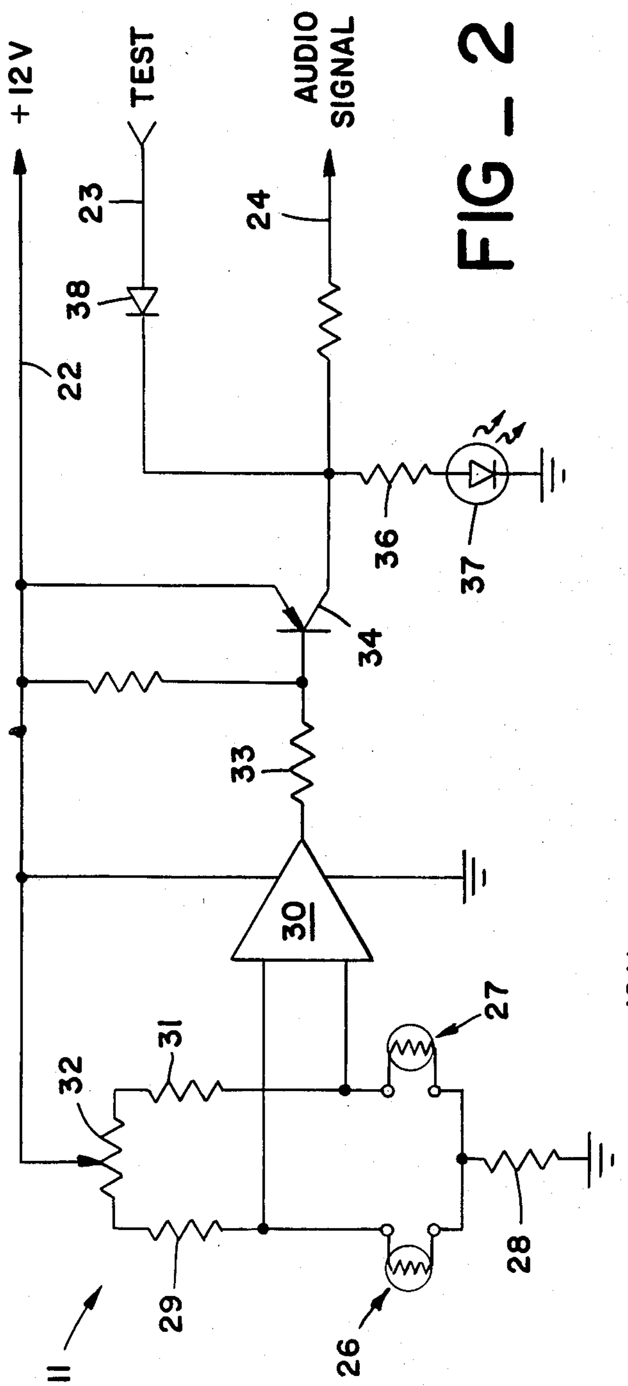
FIG. 2 is a schematic representation of the moisture sensing circuit of the present invention.

With reference to FIG. 1, the system of the present invention includes a moisture monitoring circuit 11, a temperature monitoring circuit 12, an attention monitoring circuit 13, a motion monitoring circuit 14, and a speed monitoring circuit 16. Each of the monitoring circuits continuously senses its respective driving condition, and emits an alarm signal when a hazardous condition is sensed. The outputs of all of the monitoring circuits are connected to an audio signal logic circuit 17, which in turn is connected to an audio signal device 19. A control switch 21 provides operating voltage for the audio signal device 19, a test signal to each of the monitoring circuits to assure their operability, and also the twelve volt supply to all of the monitoring circuits. The entire device, as shown in FIG. 1, may be mounted within a small cabinet and secured beneath the dashboard of an existing vehicle. Alternatively, the present invention may be incorporated as original equipment in an automobile or other vehicle.

The monitoring circuit 11 includes a pair of thermistors 26 and 27 which are configured as the sensing elements of the circuit. The thermistor 26 is sealed in an enclosure which prevents direct contact with the outside air. The thermistor 27 is mounted in an enclosure which allows air from near the road surface to flow freely about the device. Like ends of the thermistors are connected through a limiting resistor 28 to ground, while the other ends of the thermistors are connected to the two inputs of a differential amplifier 30. The thermistors are also connected through equal resistors 29 and 31 to a rheostat 32 which is connected to the twelve volt supply line 22. The rheostat 32 and the resistors 29 and 31 comprise a voltage divider which is adjustable to equalize the voltage applied to the two inputs of the differential amplifier 30. When moisture-laden air comes in contact with the exposed thermistor 27, heat is dissipated into the air via the moisture content thereof, cooling the thermistor and altering its electrical resistance. The sealed thermistor will not dissipate its heat as quickly, and its resistance will not change as quickly. (Both thermistors are self-heated by the small current flowing therethrough.) If the imbalance in the resistances of the thermistors becomes sufficiently large, as when excess moisture is on the roadway, a voltage differential will develop and be applied to the amplifier 30, triggering an output therefrom.

The output of differential amplifier 30 is conducted through a limiting resistor 33 to the base of transistor 34. The output signal from amplifier 30 switches on the transistor 34, allowing current to flow from the twelve volt line 22 through the transistor and through limiting resistor 36 and light emitting diode 37. The audio signal line 24 is also connected to the output of transistor 34 so that the audio signal is actuated whenever road moisture becomes a hazard. The test line 23 is connected through diode 38 to the LED 37 and to the audio signal line 24, so that a test voltage will actuate the LED and the audio signal to assure their operativeness.

Figure 3:
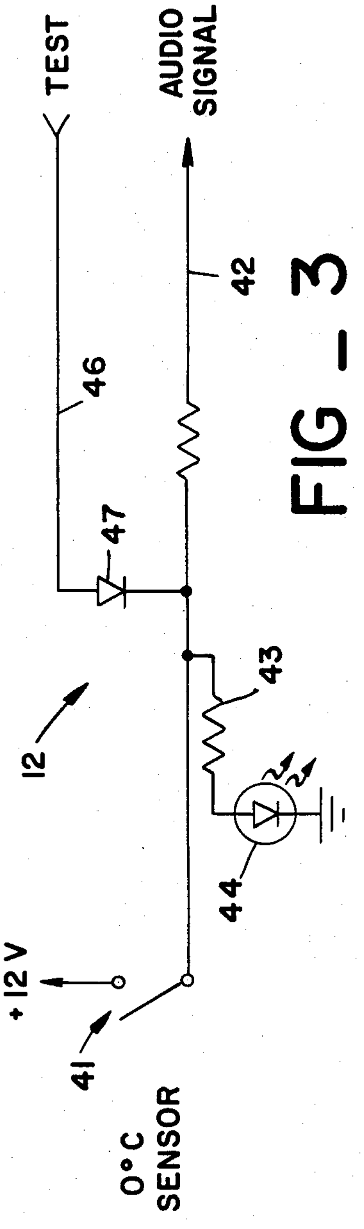
FIG.3 is a schematic representation of the road surface temperature sensing circuit of the present invention.

With reference to FIG. 3, the temperature monitoring circuit 12 of the present invention includes a temperature sensor 41 which is connected between the twelve volt vehicle power supply and the audio signal line 42 which leads to the audio signal logic 17. The sensor 41 is also connected through a resistor 43 to a light emitting diode 44. A test signal line 46 is connected through an isolating diode 47 to the LED 44 and to the audio signal line 42. The sensor 41 may comprise a temperature sensing read switch which includes a magnetic actuator in which the magnetic reluctance varies markedly with the ambient temperature. One such device is freeze sensor model no. MCI-5B, manufactured by Midwest Comp, Inc. When the switch 41 closes in response to ambient freezing temperatures, the twelve volt vehicle supply is applied directly to the LED 44 and to the audio signal line, causing the LED to light and the audio signal to actuate. The detector 41 is self-resetting.

It may be appreciated that the freezing sensor 41 and the moisture sensing thermistor 26 should be mounted on a portion of the vehicle which is closely adjacent to the road surface, so that actual driving conditions may be monitored.

Figure 5:
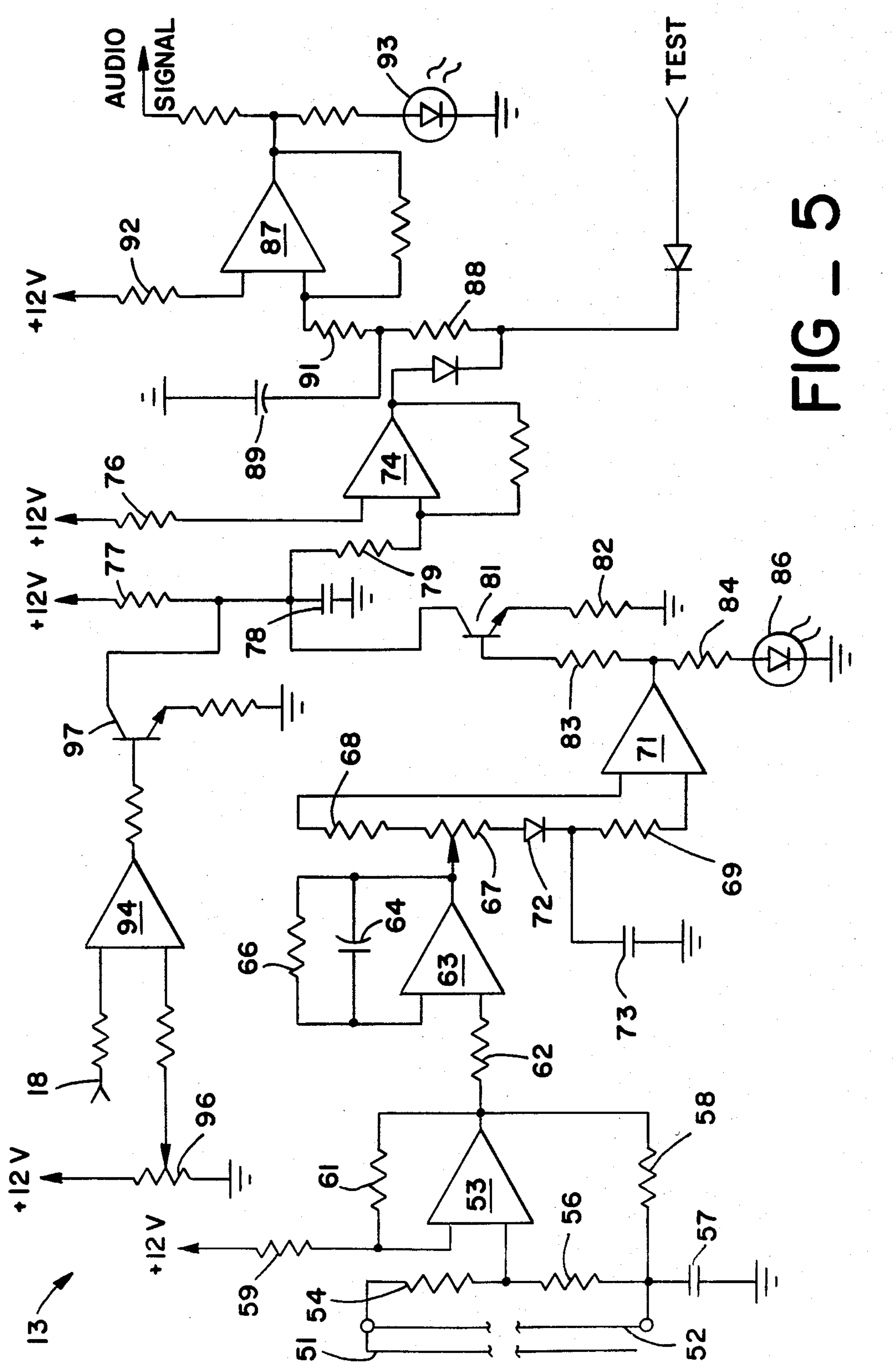
FIG. 5 is a schematic representation of the driver attention monitoring circuit of the present invention.

As shown in FIG. 5, the attention monitor 13 includes an attention sensor comprising a pair of parallel, non-contacting conductors 51 and 52. The conductors 51 and 52 are wrapped about the steering wheel of the vehicle in parallel fashion so that the hands of the driver will contact both of the conductors.

The conductor 51 is connected through resistor 54 to one input of an operational amplifier which has been configured as a square wave generator, while the conductor 52 is connected through resistor 56 to the same input of the op amp 53. The conductor 52 is also connected through capacitor 57 to ground, and through feedback resistor 58 to the output of the op amp 53. The other input of the op amp 53 is connected through resistor 59 to the twelve volt vehicle supply, while a resistor 61 is connected between the same input and the output of op amp 53.

The capacitor 57 alternately charges and discharges between the voltage limits established by the resistor 56 and the resistor 61, producing a Schmitt trigger circuit which is essentially free-running and independent of the vehicle supply voltage. When the hands of the driver bridge the conductors 51 and 52, they alter the effective resistance of the 2.2 megaohm resistor 56. As a result of the varying resistance, the frequency of the square wave generator is likewise varied. Indeed, whenever the driver's hands are moved about on the steering wheel wrapped with the conductors 51 and 52, the frequency of the output of the square wave generator 53 is altered. It has been demonstrated that a frequency shift in excess of five kilohertz can be produced by hand movement on the steering wheel.

The square wave output of the op amp 53 is fed through a resistor 62 to one input of an operational amplifier 63 which is configured as a basic tachometer. The output of the op amp 63 is conducted through a parallel RC network consisting of a capacitor 64 and a resistor 66 connected to the other imput of the op amp 63. As is known in the prior art, the DC output voltage from the tachometer 63 increases with an increase of the input frequency of the square wave from the op amp 53. Likewise, a decrease in the frequency of the square wave signal will provide a lower output voltage from the tachometer.

The varying DC voltage from the tachometer 63 is fed through a rheostat 67 to a voltage divider consisting of resistor 68 and 69, each of which is connected to one input of an op amp 71 which is configured as a level shift indicator. Connected to one arm of the voltage divider are a diode 72 and a capacitor 73 which is connected to ground. It may be noted that both the reference voltage and the input voltage of the op amp 71 are derived from the same voltage source, i.e., the varying DC voltage of the op amp 63. Normally the output of the comparator 71 is low because the input equals the reference voltage. When the input voltage falls suddenly, the reference voltage will lag behind the input voltage due to the presence of the charging capacitor 73 in one arm of the voltage divider. As a result of the imbalance of the inputs, a positive output pulse is generated by the op amp 71. Thus it may be seen that a change in hand position on the steering wheel will cause the comparator to switch from low to high output states.

The attention monitor also includes an operational amplifier 74 which is configured as a timer. One input of the op amp 74 is connected through resistor 76 to the twelve volt vehicle supply, while the other input is connected through resistor 79 to a series RC timing network comprising a resistor 77 and a capacitor 78 which is connected to ground. In the preferred embodiment, the capacitor 78 will charge sufficiently approximately every sixteen seconds to cause the op amp 74 to generate an output. However, the capacitor 78 is also connected through transistor 81 and resistor 82 to ground, whenever the resistor 81 is turned on. The base of transistor 81 is connected through resistor 83 to the output of the op amp 71. The output of op amp 71 is also connected through resistor 84 to light emitting diode 86. Whenever there is a positive output from the level comparator 71, the transistor 81 is switched on and the charge accumulating on capacitor 78 is grounded. Thus the timer 74 will actuate every sixteen seconds unless a pulse from op amp 71, indicative of hand movement on the steering wheel, is received by the transistor 81. Of course, the output of level comparator 71 also actuates the LED 86 to provide visual indication of operation of the circuit.

The attention monitor 13 also includes an operational amplifier 87 which is configured as a pulse expander. The output of op amp 74 is connected through resistor 88 to a grounded capacitor 89, and also to a resistor 91 which is connected to one input of the op amp 87. The other input of op amp 87 is connected through resistor 92 to the twelve volt vehicle supply. A brief pulse output from the op amp 74 will actuate the op amp 87 and also create a stored charge in the capacitor 89. The stored charge will continue actuation of the op amp 87 for approximately seven seconds. The output of op amp 87 is connected to the audio signal logic 17, and to a light emitting diode 93 on the exterior of the unit. The seven second minimum actuation of op amp 87 assures that the audio signal and the LED 93 will alarm the inattentive or drowsy driver and cause the driver to reassert control of the vehicle.

The attention monitor also includes a speed detector circuit which effectively defeats operation of the attention monitor when the vehicle is not in motion. An operational amplifier 94 has one input connected to the speed signal line 18 which provides a DC voltage analog of the vehicle's speed. The other input is connected to a rheostat 96 which is connected between the twelve volt power supply and ground. The output of the op amp 94 is connected to the base of transistor 97 to switch the transistor off and on. The emitter collector circuit is connected between capacitor 78 and ground, so that actuation of the transistor 97 will ground the capacitor 78 and prevent actuation of the op amp 74. Thus, whenever a speed signal from line 18 is applied to the op amp 94, the op amp 94 will turn off, the transistor 97 will be switched off, and the timer 74 will operate normally. Whenever there is no speed signal applied through line 18, the op amp 94 will switch on the transistor 97 and prevent actuation of the timer 74.

It may be appreciated by those skilled in the art that the conductors 51 and 52 may be embedded in a common tape carrier which is secured about the steering wheel, or may comprise conductive tape or cloth wrapped about the steering wheel. The conductors may be connected directly from the rotatable steering wheel to the housing in which the circuitry of the present invention is contained. This is practical when there is sufficient room inside the horn switch area of the steering wheel hub to contain the slack wire required to permit free rotation of the steering wheel. Alternatively, the square wave generator portion 53 of the attention monitor may be placed inside the horn switch area of the steering wheel hub, the requisite twelve-volt supply being provided by the supply line to the horn switch. The output from the op amp 53 may then be coupled optically by an LED mounted on the steering wheel and an infrared detector mounted on the steering wheel column. As another alternative, the signal from the op amp 53 disposed in horn switch area may be coupled capacitively to the horn relay wire. Because of the lower power and high frequency of the square wave signal, the horn and horn relay would be uneffected. At the base of the steering column, the horn relay wire is capacitively coupled to the remainder of the attention monitor circuit.

Figure 4:
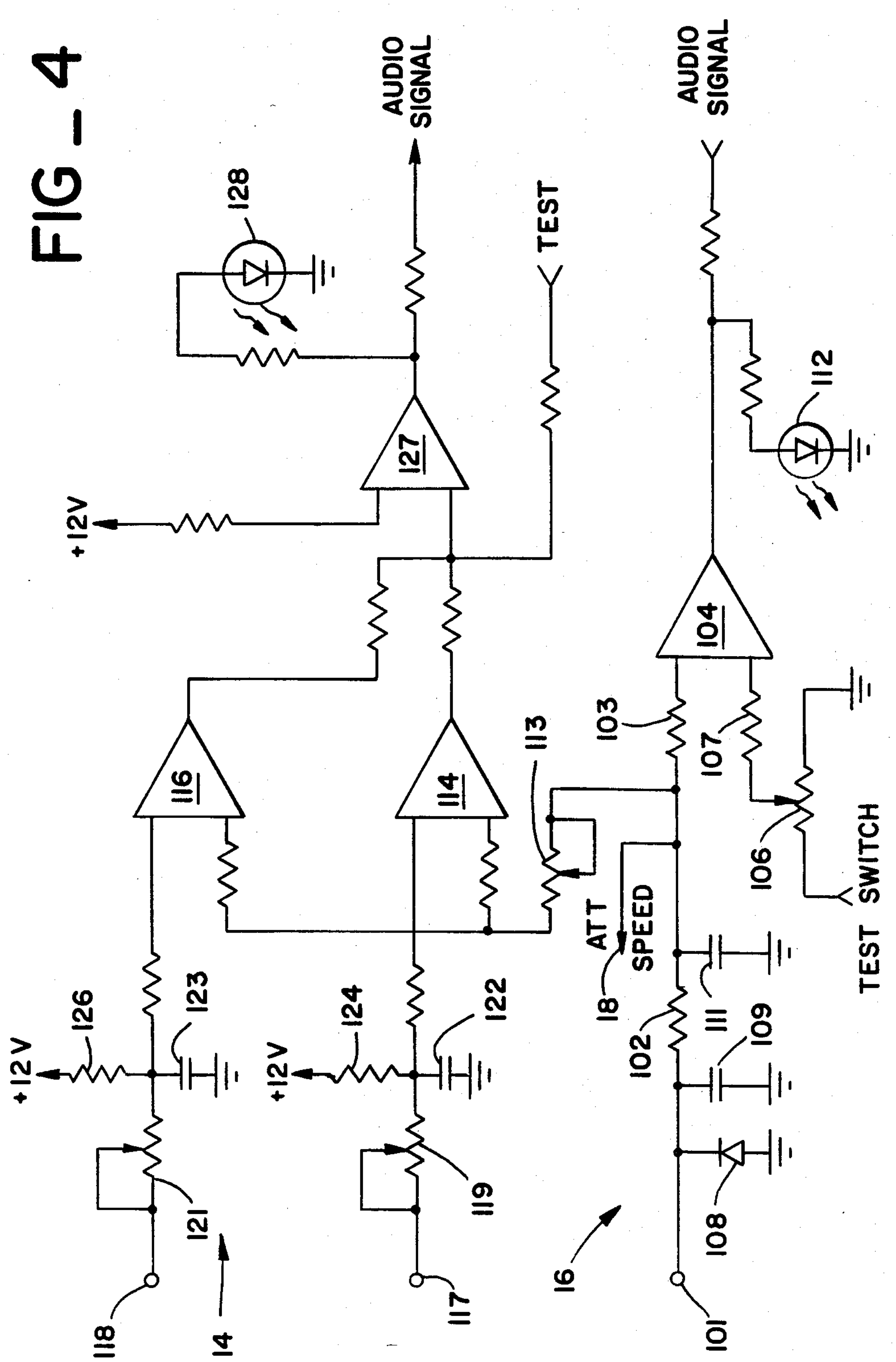
FIG. 4 is a schematic representation of the motion sensing and speed sensing circuit portion of the present invention.

The speed monitor circuit 16, shown in FIG. 4, includes an input 101 which receives a DC speed signal which varies directly with the speed of the vehicle. The voltage is provided by a small, permanent magnet, DC motor which is used as a voltage generator and mechanically connected to the speedometer cable of the vehicle. Mechanical devices of this type are known in the prior art and are currently availble from many sources. The signal is applied through resistors 102 and 103 to one input of an operational amplifier 104 which is configured at a non-inverting voltage comparator. The other input of the op amp 104 is a variable voltage provided by a rheostat 106 through a limiting resistor 107. Diode 108 and capacitors 109 and 111 are connected from the terminal 101 to ground to filter the speed signal and prevent false triggering of the comparator. When the speed signal from the motor generator exceeds the voltage level set by the rheostat 106, the op amp 104 will switch to its high output voltage and actuate LED warning lamp 112 and the audio signal of the device. It may be appreciated that the rheostat 106 may be used to set the desired speed beyond which the monitor will trigger the alarm.

The filtered DC speed signal is also fed to line 18 and thence to op amp 94, as described in the foregoing description. The filtered speed signal is also conducted through a variable resistor 113 to the inputs of operational amplifiers 114 and 116 which are configured as inverting voltage comparators. The filtered speed signal comprises the reference voltage for the op amps 114 and 116.

The inputs 117 and 118 to the op amps 114 and 116, respectively, are connected to normally open vibration sensitive switches which are in turn connected to the vehicle supply voltage. Such vibration sensitive switches are known in the prior art, and are disclosed in U.S. Pat. Nos. 3,823,310, issued Aug. 6, 1974, and 4,023,157, issued May 10, 1977, both patents to Albert J. Miller. One of these switches is oriented to be sensitive to vertical vibration, the other is oriented to be sensitive to horizontal motion. Whenever the vehicle motion along the respective axis is sufficient to close the vibration sensing switch, the inputs 117 and 118 are momentarily grounded. The inputs 117 and 118 are connected through variable resistors 119 and 121, respectively, to grounded capacitors 122 and 123, respectively. Resistors 124 and 126 are also connected between the respective capacitors and the twelve volt vehicle supply. This junction is also connected through limiting resistors to the inputs of op amps 114 and 116.

When the vehicle undergoes excessive lateral or vertical motion, the appropriate motion detector will close momentarily and ground the input 117 or 118. This will discharge the respective capacitor 122 or 123, lowering the voltage delivered to the input of the comparator. When the reference voltage (speed signal) becomes larger than the input voltage, the op amp 1144 or 116 will switch to its high conductive state. Both the outputs of op amps 114 and 116 are connected through limiting resistors to a common input of operational amplifier 127. The op amp 127 is configured as an AND gate to be triggered by either of the op amps 114 or 116 to actuate LED warning lamp 128 as well as the audio signal of the system.

It may be appreciated that the motion detector of the present invention provides an evaluation of the lateral and vertical motion of the vehicle which is directly varied by the speed of the vehicle. Thus excessive lateral or vertical motion at low speeds will not actuate the alarm, nor will slight lateral or vertical displacements trigger the alarm at higher vehicle speeds.

I claim:

1. A vehicle driving condition monitoring system for warning of dangerous driving conditions, including sensor means mounted on the vehicle for detecting dangerous driving conditions, said sensor means including first sensor means for detecting excessive moisture on the road surface, second sensor means for detecting freezing temperature at the road surface, third sensor means for detecting excessive vibration of the vehicle in both horizontal and vertical directions, fourth sensor means for detecting excessive vehicular speed, and fifth sensor means for detecting drowsiness or inattention of the driver of the vehicle, said fifth sensor means including means for sensing lack of movement of the driver's hands on the steering wheel of the vehicle, comprising a pair of conductors wrapped about the steering wheel in non-connecting fashion, said conductors being connected in parallel with a RC timing network, frequency generator means connected to said timing network for generating an ac signal having a frequency which varies with the impedance of said timing network, means for sensing changes in said frequency of said ac signal, means for generating an alarm actuating signal in response to said predetermined changes in said ac signal, and alarm means connected to said sensors for emitting audible and visible alarm signals to the driver.

2. The vehicle driving condition monitoring system of claim 1, wherein said first sensor means includes a pair of thermistors, means for disposing one of said thermistors in a bath of ambient air adjacent to the road surface, means for insulating the other thermistor from said ambient air, and means for comparing the resistances of said thermistors and generating an alarm actuating signal in response to an imbalance in said resistances.

3. The vehicle driving condition monitoring system of claim 1, wherein said second sensor means includes a thermostatic switch, means for disposing said switch in a bath of ambient air adjacent to the road surface, and means for generating an alarm actuating signal in response to closure of said switch.

4. The vehicle driving condition monitoring system of claim 1, wherein said fourth sensor means includes means for generating a speed signal having a dc voltage which varies according to the vehicle speed, means for generating a selectively variable reference voltage, and first voltage comparator means for comparing said speed signal and said reference voltage and generating an alarm actuating signal when said speed signal voltage exceeds said reference voltage.

5. The vehicle driving condition monitoring system of claim 4, wherein said third sensor means includes capacitive reference voltage means adapted to charge to a predetermined voltage level, vibration sensitive switch means connected between said capacitive reference voltage means and ground for discharging said capacitive reference voltage means in response to vibration thereof, voltage comparator means for comparing said speed signal and said capacitive reference voltage means and for generating and alarm actuating signal when said speed signal voltage exceeds said capacitive reference voltage.

6. The vehicle driving condition monitoring system of claim 1, wherein said means for sensing changes includes means for rectifying and averaging said ac signal to form a dc signal, and means for sensing changes in voltage in said dc signal.

7. The vehicle driving condition monitoring system of claim 6, wherein said last mentioned means includes voltage comparator means for sensing changes in voltage in said dc signal and generating an alarm defeat signal in response thereto.

8. The vehicle driving condition monitoring system of claim 7, further including timer means for generating reiteratively an alarm actuating signal after a predetermined time period, and means responsive to said alarm defeat signal for resetting said timer means to the beginning of said time period.

9. The vehicle driving condition monitoring system of claim 8, further including means for sensing vehicle speed and generating a speed signal in response thereto, voltage comparator meana for comparing said speed signal to a fixed reference level and for generating an alarm defeat signal in response to a low speed signal, and means for connecting said voltage comparator to said means responsive to said alarm defeat signal.

* * * * *